(No Model.)

C. T. LEE.
INSULATOR.

No. 467,941. Patented Feb. 2, 1892.

WITNESSES.
A. H. Morrison
W. H. Hawley

INVENTOR.
Charles Tennant Lee,
by
Macleod Calver & Randall
his Atty.

THE NORRIS PETERS CO., PHOTO-LITHO., WASHINGTON, D. C.

UNITED STATES PATENT OFFICE.

CHARLES TENNANT LEE, OF BOSTON, MASSACHUSETTS, ASSIGNOR OF ONE-HALF TO THE GOULD & WATSON COMPANY, OF SAME PLACE.

INSULATOR.

SPECIFICATION forming part of Letters Patent No. 467,941, dated February 2, 1892.

Application filed September 28, 1891. Serial No. 407,032. (No model.)

*To all whom it may concern:*

Be it known that I, CHARLES TENNANT LEE, a citizen of the United States, residing at Boston, in the county of Suffolk and State of Massachusetts, have invented certain new and useful Improvements in Insulating-Supports for Electric Wires, of which the following is a specification, reference being had therein to the accompanying drawings.

My invention has for its object to produce a strong, durable, and effective insulating-support for electric line-wires; and it consists in the improved device hereinafter set forth, and the novel features of which are more fully pointed out in the claim, which is appended hereto and forms a part hereof.

My device is what is commonly called a "hanger," and is used chiefly for supporting line or guard wires which are employed in electric-railway construction. It will be readily understood from the following description, in which reference is made to the accompanying drawings, in which—

Figure 1:
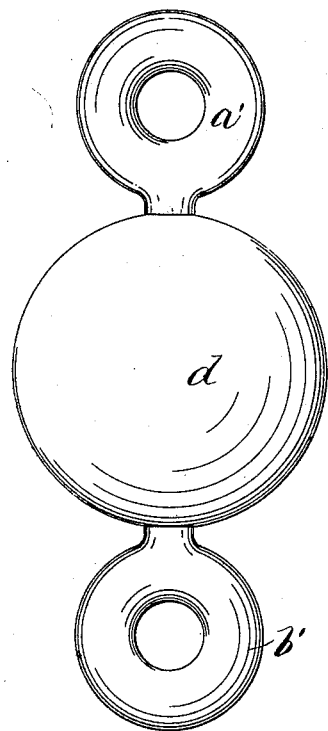
Figure 2:
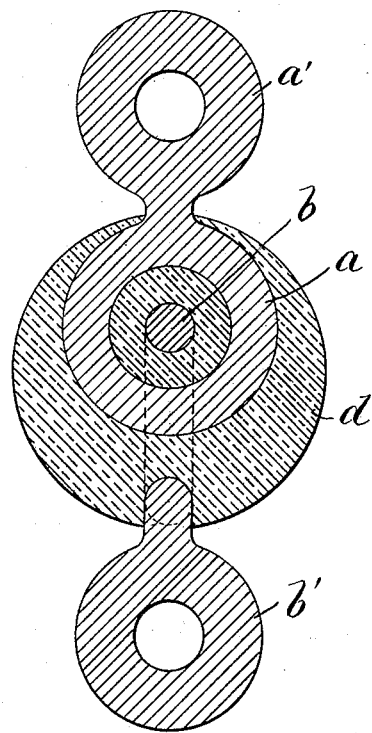

Figure 1 is an elevation, and Fig. 2 a central lengthwise section.

The metal parts of the hanger consist of two links $a\ b$, Fig. 2, which are linked together, one link being in a plane substantially at right angles to the other and each being provided with an eye $a'\ b'$, respectively, by which the hanger may be connected with the adjacent parts of the construction. The links are wholly insulated from each other by insulating material $d$, which is molded and compressed against and between them while in a plastic condition. The precise character of the insulating composition employed is not material to my present invention. I prefer, however, to use a composition consisting of comminuted mica mixed and incorporated with a resinous gum. After the plastic mass of material has been placed around the links, which have been previously set in a recessed die, the dies are brought together and pressure applied and the plastic mass solidly compressed and molded around the links, while its exterior is preferably given the globular shape shown. By this construction a hanger of great strength is produced, any strain to which it is subjected being distributed not only with reference to the metal parts but also with reference to the insulating composition. The tendency of the composition to crack or break under strain is reduced to a minimum.

The exterior form of the device is particularly adapted to shed moisture and diminish the liability of breakage from a sudden blow or other cause while the hanger is in use, and the globular shape of the insulating material is one well suited to give a high degree of strength with a small mass.

It will be obvious that, instead of the eyes $a'\ b'$, any other suitable form of attaching device may be employed.

I am aware that insulators have been constructed employing metal hooks which are embedded in a mass of insulating material, such a construction being shown in Letters Patent No. 445,790, dated February 3, 1891, and I do not claim the same.

What I claim is—

An insulating-support for electric wires, comprising the metallic links $a\ b$, each provided with a suitable attaching device, said links being linked together and held out of contact with each other by an intervening mass of insulating material in which said links are embedded, substantially as shown and described.

In testimony whereof I affix my signature in presence of two witnesses.

CHARLES TENNANT LEE.

Witnesses:
 WM. A. MACLEOD,
 A. H. MORRISON.